United States Patent [19]

Boden

[11] 4,424,609

[45] Jan. 10, 1984

[54] LOCK FOR GRIPPING CORDS OR THE LIKE

[76] Inventor: Ogden W. Boden, 1580 Gaywood Dr., Altadena, Calif. 91001

[21] Appl. No.: 339,973

[22] Filed: Jan. 18, 1982

[51] Int. Cl.³ .............................................. F16G 11/00
[52] U.S. Cl. .................................... 24/134 R; 24/191; 24/498
[58] Field of Search .......... 24/134 R, 134 KB, 134 P, 24/120, 129 A, 191, 170, 178, 132 AA, 132 WL, 134 KA, 132 R; 40/16

[56] References Cited

U.S. PATENT DOCUMENTS

| | | | |
|---|---|---|---|
| 697,710 | 4/1902 | Gebhard | 24/134 R |
| 805,631 | 11/1905 | Chapman | 24/134 R |
| 842,329 | 1/1907 | McClean | 24/134 R |
| 1,410,162 | 3/1922 | Caldwell | 24/134 R |
| 1,526,606 | 2/1925 | Moloney | 24/134 R |
| 2,431,819 | 12/1947 | Meyer | 24/132 R |
| 2,968,077 | 1/1961 | Miller et al. | 24/134 R |
| 3,849,917 | 11/1974 | Bergh et al. | 40/16 |
| 4,300,269 | 11/1981 | Boden | 24/134 R |

FOREIGN PATENT DOCUMENTS 641275 9/1946 United Kingdom ............. 24/134 R
721464 1/1953 United Kingdom ............. 24/134 R Primary Examiner—Gene Mancene
Assistant Examiner—John Weiss
Attorney, Agent, or Firm—William P. Green

[57] ABSTRACT

A device for retaining a cord or other elongated flexible element against relative longitudinal movement including a first member to which an actuating member is mounted for relative pivotal movement between locking and released positions, and a locking member carried by the actuating member for swinging movement therewith, and for swinging movement relative thereto, to clamp a cord or cords against the first member, with the latter preferably containing a recess having an essentially curving wall against which the locking member presses the elongated element in locking condition, and with the curving wall preferably being defined by a series of teeth following a curving pattern. The device may lock two spaced cords or cord ends, which may be directed to properly located positions between the gripping members by reception within spaced locating recesses in the locking member and by reception at opposite sides of a locating projection carried by the first mentioned member.

11 Claims, 10 Drawing Figures

LOCK FOR GRIPPING CORDS OR THE LIKE

BACKGROUND OF THE INVENTION

This invention relates to locking devices for releasably retaining one or more elongated flexible elements against longitudinal movement in a predetermined direction. The invention will be described primarily as applied to a device in which the retained element is a cord or pair of cords or cord ends, though it is to be understood that the invention in its broadest aspects is applicable to other types of flexible elements.

U.S. patent application Ser. No. 136,406 filed Apr. 1, 1980 on "Device for Gripping an Elongated Flexible Element" discloses a locking device in which a gripping action on a belt or other elongated flexible element is attained by provision of a swinging locking assembly consisting of two parts which swing together relative to another member and which also are free for limited pivotal movement relative to one another in a final take-up or clamping action. A first of the parts of the swinging assembly may be considered as an actuating member which is manually operable pivotally between released and active positions, while the second of the two parts may be receivable about a portion of the actuating member in a manner causing the second part to move pivotally with the actuating member but giving it also the desired freedom for relative pivotal movement. Swinging movement of the actuating member then brings two clamping surfaces relatively toward one another to initially clamp the elongated flexible element against relative longitudinal movement, and further pivotal movement of the second part of the assembly relative to the actuating member tightens the gripping action.

A prior art locking device which has been in use for a number of years for retaining two cords or cord ends against longitudinal movement includes two metal parts which swing relative to one another between active cord gripping and released positions, with one of the parts having a loop projecting through a slit in the other part in the active locking condition for reception of the padlock, and with the two parts being cammed relative to one another to grip cords therebetween.

SUMMARY OF THE INVENTION

The present invention provides an improved locking device for gripping an elongated element or elements, and which in its preferred form is especially adapted for gripping two cords or cord ends, typically the opposite ends of a drawstring of a bag or the like. The device desirably utilizes a two-part swinging locking assembly of the general type shown in my above mentioned U.S. patent application Ser. No. 136,406, but with improvements directed toward maximizing the facility of operation and gripping effectiveness when used as a cord lock, while at the same time attaining a very substantial load carrying capacity and a structural strength assuring satisfactory and reliable operation of the device over a long period of time.

Some of the advantages of the device are attained by improvements in the configuration of the surface or face against which the locking member of the two part swinging locking assembly presses the cords in their locking condition. That surface preferably forms an essentially curving wall of a recess into which the locking member urges the cords. Also, the mentioned surface or face desirably has a series of teeth which engage the cords in a relation increasing the resistance to longitudinal movement thereof in the locked condition of the parts, but with those teeth preferably being smaller than opposed teeth formed on the locking member itself. During initial threading of the cords through the locking device, the two cords may be directed into properly spaced essentially parallel relation by reception within two spaced locating grooves or recesses formed in the locking member, and/or by a projection formed on a member of the device and projecting toward the locking member at a location between the two cords.

The actuating arm may be retained in its locking position by a detenting arrangement including a detent part projecting from one of the coacting members and engageable with a structure formed on the other member, with these detenting parts preferably being located between two guideways formed on one of the members and through which the two cords extend. A loop for receiving a padlock and holding the parts in locked condition may project from one of the members and through a slit in the actuating member or arm, at a location between the axis of swinging movement of the parts and the detenting elements.

BRIEF DESCRIPTION OF THE DRAWINGS

The above and other features and objects of the invention will be better understood from the following detailed description of the typical embodiment illustrated in the accompanying drawings in which.

DESCRIPTION OF THE PREFERRED EMBODIMENT

Figure 1:
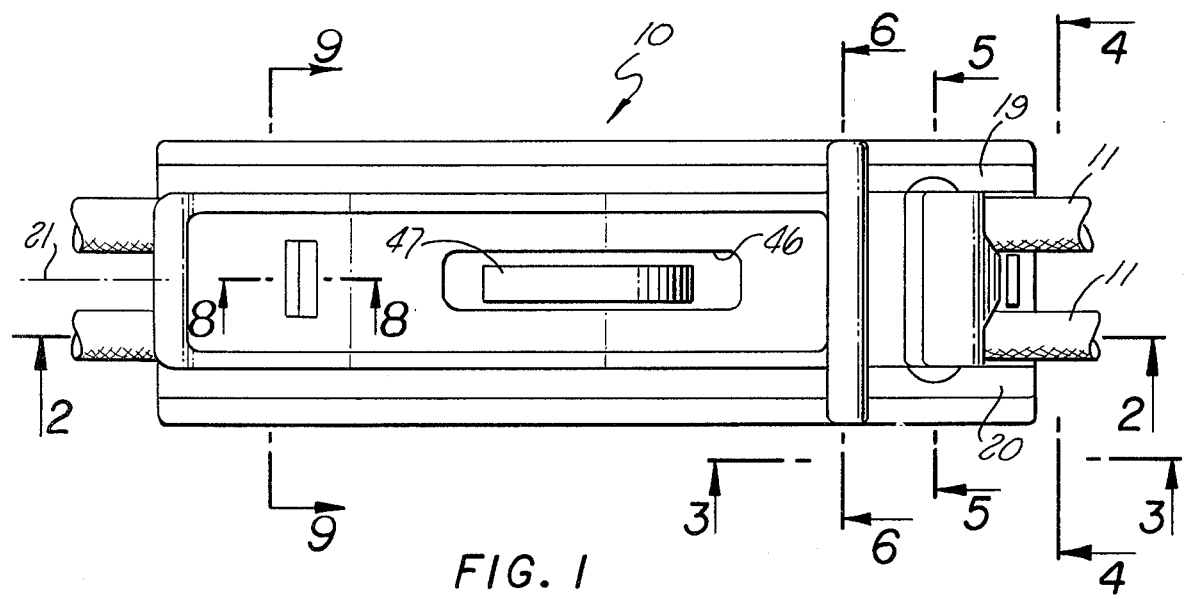
FIG. 1 is a plan view of a cord lock constructed in accordance with the invention.

A locking device embodying the present invention is designated generally by the number 10 in the drawings, and is adapted to be utilized for preventing longitudinal movement of a pair of flexible cords 11, which may be either separate cords or opposite ends of a single drawstring of a mail bag, garment or the like. The device when in its locked conditions prevents movement of the cords in a rightward direction as viewed in FIGS. 1 and 2.

Figure 2:
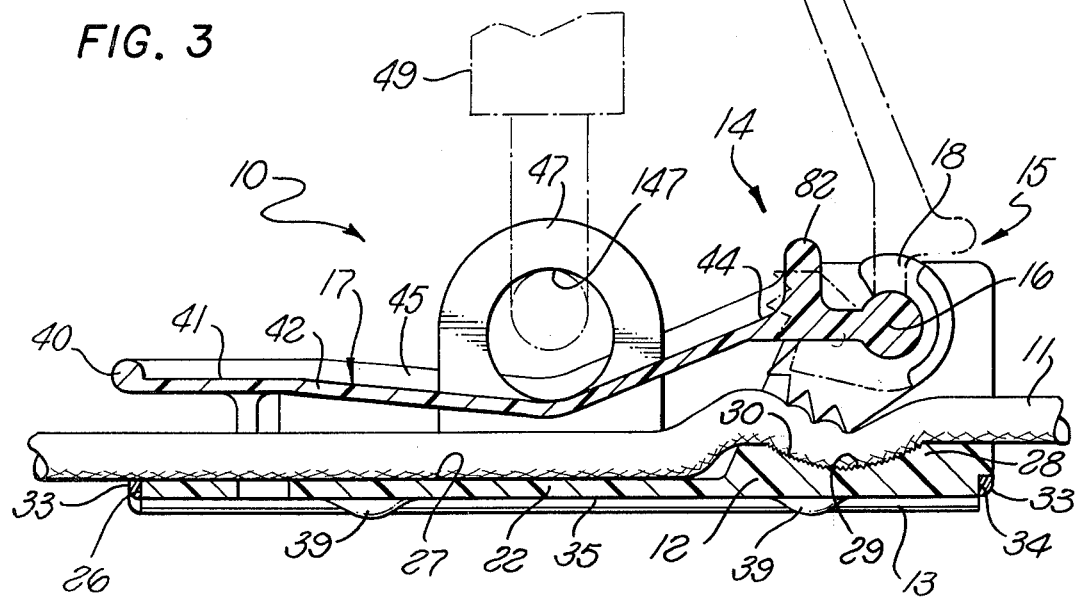
FIG. 2 is vertical section taken on line 2—2 of FIG. 1.

The cord lock 10 includes a first part or member 12 having a label or card holding frame 13 at its underside as viewed in FIG. 2, and an assembly 14 connected to member 12 by a hinge structure 15 for relative pivotal movement about an axis 16 between the full line locking position of FIG. 2 and the broken line released position of that figure. Assembly 14 includes an actuating member 17 and a locking member 18 which is free for limited pivotal movement relative to member 17 and about axis 16.

Figure 3:
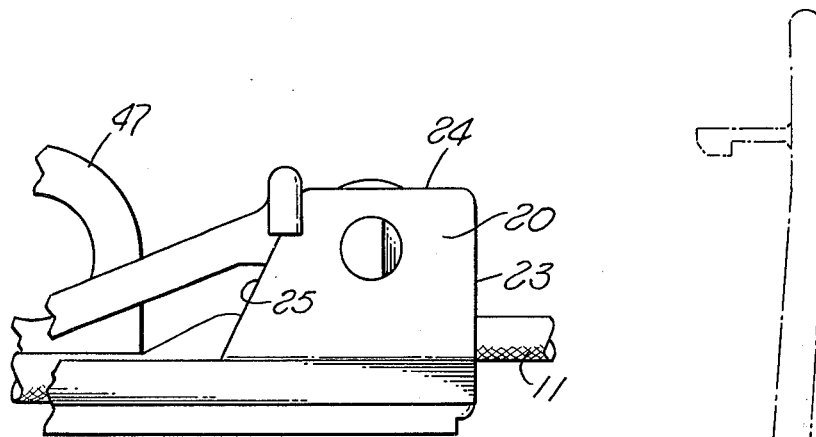
FIG. 3 is a fragmentary side elevational view taken on line 3—3 of FIG. 1.

Member 12 has, near its right end as viewed in FIGS. 1 and 2, two opposite side walls 19 and 20 extending parallel to one another and to a central longitudinal plane 21. The device will be described in the present specification as positioned to have plane 21 and side walls 19 and 20 in vertically extending condition. Walls 19 and 20 project upwardly from opposite sides of a horizontal bottom wall 22 of member 12, and may be formed integrally therewith. As seen in FIG. 3, the two side walls 19 and 20 may be defined by directly vertical forward edges 23, horizontal top edges 24, and inclined rear edges 25, with the bottom wall 22 projecting leftwardly beyond these side walls to a transverse end 26 of the bottom wall. Cords 11 extend essentially parallel to one another in laterally spaced relation above bottom wall 22, and in the FIG. 2 position of the parts may rest on and be supported by a horizontal planar or upper surface 27 of bottom wall 22 except at the location of an upwardly projecting gripping portion 28 formed on body 12 at its right end. This portion 28 defines a recess 29 into which gripped portions of cords 11 are pressed downwardly by locking member 18 and against an essentially curving gripping surface or face 30 forming a wall of the recess. The precise configuration which is desirably given to gripping face 30 will be described in greater detail at a later point.

The label or card holder 13 is rectangular and extends along the periphery of member 12 at its underside, and has two parallel opposite side portions 31 received and secured within grooves 32 formed in the side edges of member 12, and two transverse end portions 33 received and secured within end grooves 34 in member 12. The card holding frame 13 may be secured to member 12 in any appropriate manner as by fusion bonding the upper surfaces of portions 32 and 33 of member 13 along their entire length to member 12 by ultrasonic welding.

The side portions 31 of card holder 13 project downwardly beneath the level of horizontal undersurface 35 of member 12 to form two flanges 36 defining guideways 37 within which the opposite edges of a card 38 are receivable, with a rounded projection or projections 39 of part 12 projecting downwardly in a relation engaging and slightly deforming the central portion of the card to frictionally retain it in the guideway formed between flanges 36. A name, address, or other identification can be printed on card 38 to identify the item to which cords 11 and the lock device 10 are attached.

The swinging actuating member 17 forms an arm which extends generally horizontally in the FIG. 2 locked position of the parts, and which is manually engageable at its leftward extremity 40 to swing member 17 in either direction between its full line and broken line positions. Member 17 may be considered as having a wall 41 which is generally horizontal in the FIG. 2 full line position of the parts, and more particularly which may extend first approximately directly horizontally from its left handle end to a location 42, then curve downwardly to a location 43, and then advance back upwardly at an inclination from the location 43 to a point 44. Strengthening or stiffening ribs 45 may extend along and project upwardly a short distance from the opposite side edges of wall 41 of actuating member 17. At a central location, wall 41 of member 17 contains a slot 46 which is elongated essentially parallel to the main longitudinal axis 21 of member 12, and which in the FIG. 2 full line position of member 17 receives a padlock loop 47 formed integrally with and projecting upwardly from bottom wall 22 of member 12. Loop 47 contains an opening 147 adapted to receive the locking portions 48 of a padlock 49 at a location above actuating member 17 to lock member 17 in its FIG. 2 full line position and against upward cord releasing movement. The lowest portion 43 of wall 41 of actuating member 17 is located to engage portion 48 of the padlock in the locking condition of the parts. In that condition, the left end 40 of member 17 is spaced above bottom wall 22 of member 12 and above cords 11 to allow easy manual actuation of member 17 upwardly from the locking condition to released condition, as by manually grasping handle end 40 of member 17 and moving it upwardly or by inserting a user's thumb beneath end 40 and flipping it upwardly while holding the cords in the rest of the user's hand.

Figure 5:
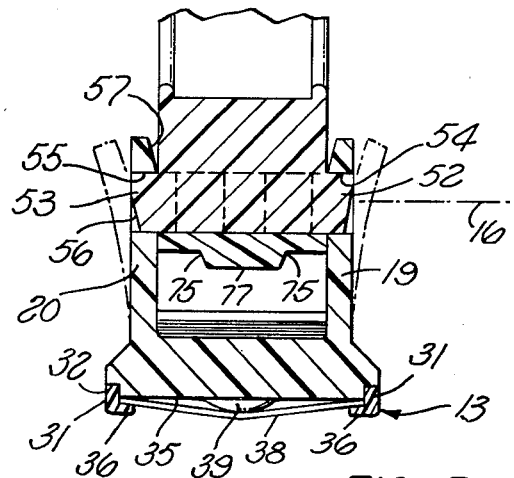
FIGS. 5 and 6 are vertical sections taken on line 5—5 and 6—6 respectively of FIG. 1.
Figure 10:
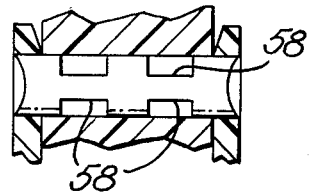
FIG. 10 is a reduced fragmentary vertical section taken on line 10—10 of FIG. 7.

At its right end, member 17 has an externally cylindrical pivot pin portion 50 whose outer cylindrical surface 51 is centered about pivotal axis 16, and whose opposite ends 52 and 53 function as cylindrical pivot lugs projecting into corresponding cylindrical openings 54 and 55 in side walls 19 and 20 centered about axis 16 to effectively mount part 17 for its discussed swinging movement. Parts 12, 17, 18 and 13 are preferably all formed of an appropriate essentially stiff or rigid resinous plastic material adapted to effectively maintain the illustrated shape configuration but resiliently deformable during assembly to enable the parts to be snapped together. With regard to assembly of parts 12 and 17 in particular, the part 17 during assembly is adapted to be forced downwardly between side walls 19 and 20 and to cam those side walls relatively apart far enough to allow pivot lugs 52 and 53 to snap into openings 54 and 55 in the side walls to complete the desired hinge connection. For this purpose, pivot lugs 52 and 53 are so configured that, when member 17 is in the upwardly projecting position represented in broken lines in FIG. 2, which position is represented in full lines in FIG. 5, two downwardly and inwardly inclined semi-circular cam surfaces 56 formed on the outer ends of pivot lugs 52 and 53 are engageable with correspondingly downwardly and inwardly inclined cam surfaces 57 formed at the inner sides of side walls 19 and 20 above openings 54 and 55 to deflect or cam walls 19 and 20 relatively apart as the cylindrical portion 50 of the member 17 is pushed downwardly (see broken line condition of FIG. 5), with those side walls then springing back by their own resilience to their initial vertical parallel condition when the pivot lug ends 52 and 53 of portion 50 reach a position of alignment with openings 54 and 55. The cylindrical external surface 51 of pivot pin or shaft portion 50 of part 17 may be continuous along the entire length of portion 50, or may be interrupted at locations typically represented at 58 for lightening purposes (FIG. 10). Extending between the cylindrical portion 50 of member 17 and the point 44, member 17 may have a portion 59 which is somewhat thicker than the discussed wall 41 of member 17 leftwardly of point 44, and which may be of a width to be closely received and confined between the inner parallel vertical surfaces 61 of side walls 19 and 20 to locate part 17 against movement along axis 16 relative to part 12.

Figure 9:
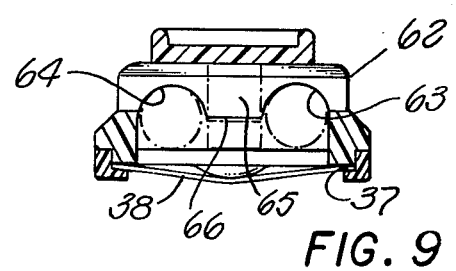
FIGS. 8 and 9 are vertical sections taken on lines 8—8 and 9—9 of FIG. 1.
Figure 8:
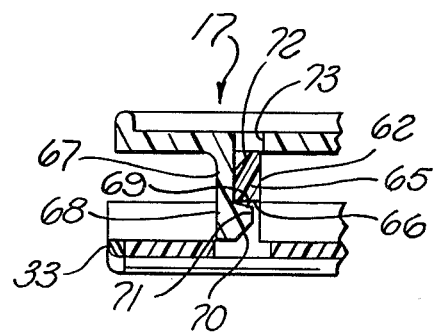

Near its left end, member 12 has an upwardly projecting wall 62 (FIGS. 8 and 9) which is molded to contain and form two guideway passages 63 and 64 dimensioned to receive and closely confine and locate cords 11 to position them in a desired laterally spaced relation at the left end of the device. Between these guideways 63 and 64, wall 62 has a detenting portion 65 with a horizontal undersurface 66 engageable with a detent lug or finger 67 projecting downwardly from and formed integrally with member 17. Lug 67 and portion 65 of wall 62 may have the cross section illustrated in FIG. 8 along the entire lateral extent of lug 67, and in particular lug 67 may have a camming rib or projection 68 extending along the lower edge portion of projection 67 and having an upper latching surface 69 inclined at a slight angle to the horizontal (preferably 10 degrees) and a lower inclined camming surface 70, with a vertical surface 71 extending therebetween. Upon downward swinging movement of member 17 toward the FIG. 2 full line position, cam surface 70 first engages an inclined camming edge 72 formed on portion 65 of member 12 to deflect lug 67 slightly leftwardly as it moves past edge 72 and ultimately reaches the full line position of FIG. 8 in which the resilience of projection 67 causes it to return rightwardly to that full line position for engagement of camming rib or hook 68 with the undersurface 66 of portion 65 of wall 62 to effectively detent or latch the member 17 in its full line position of FIG. 2 and against upward swinging movement from that position. The resilience of projection 67 is however such that if member 17 is manually forced upwardly relative to member 12, the engagement of the inclined upper surface 69 of rib 68 with the undersurface of detenting wall 62 will cam projection 67 leftwardly in a manner enabling the projection to move upwardly past wall 62 for swinging movement of member 17 to its broken line position of FIG. 2. A slit 73 may be formed in member 17 at the location of detenting lug or projection 67 to facilitate formation of that detenting projection in an injection molding process.

Figure 4:
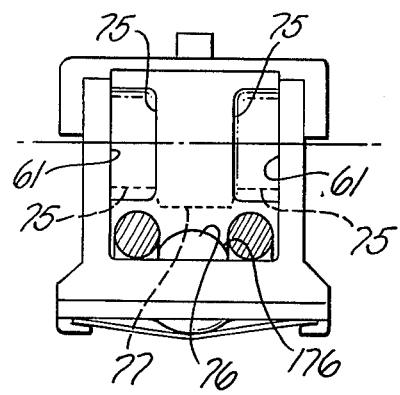
FIG. 4 is an end elevational view taken on line 4—4 of FIG. 1.

Locking element 18 like the other parts is preferably formed of essentially stiff but slightly resiliently deformable resinous plastic material, and is configured to slide axially onto and be carried by the cylindrical pivot pin portion 50 of member 17. Part 18 may extend the entire distance between the inner parallel surfaces 61 of side walls 19 and 20 of member 12, and may have parallel vertical end surfaces 74 engageable with surfaces 61 to effectively locate locking element 18 against movement along axis 16. Element 18 may have the configuration illustrated in FIG. 7 through the entire axial extent of element 18 between side walls 19 and 20, except at the location of two spaced grooves 75 which extend arcuately about axis 16 and may have the sectional configuration illustrated in FIG. 5. These grooves 75 are located symmetrically with respect to central vertical plane 21 of the device, at opposite sides thereof, and are so positioned as to receive upper portions of the two cords 11 when member 17 is in the upwardly projecting position represented in broken lines in FIG. 2 and in full lines in FIG. 5 (see also broken line position represented at 75 in FIG. 4). A projection 76 formed integrally with and projecting upwardly from bottom wall 22 of member 12 is located generally opposite the arcuate portion 77 of element 18 formed between the two grooves 75, to coact with those grooves in defining passageways at opposite sides of lug 76 and portion 77 within which the two cords are received. Lug 76 may have an upper semicircularly curved edge 176 engageable with the cords to hold them in spaced relation. Such retention of the cords by lug 76 and portion 77 of element 18 in positions near the two side walls 19 and 20 of part 12 minimizes the internal stresses which are developed in portion 28 of member 12 when the cords are under tension.

Element 18 has an internal cylindrically curving surface 78 which corresponds to and is a close fit about external cylindrical surface 51 of pivot pin portion 50 of member 17, to mount part 18 for pivotal movement relative to part 17 about axis 16 through a very limited angle (preferably 45°) determined by the width arcuately about axis 16 of a gap formed between two edges 79 and 80 of part 18. As will be understood, element 18 can swing relative to part 17 between a position in which the undersurface of portion 59 of member 17 engages edge 80 of element 18 (full lines in FIGS. 2 and 7) and a position in which the upper surface of portion 59 engages upper edge 79 of the gap in element 18. At its underside, element 18 has a series of gripping teeth 81, which are movable between the broken line released position of FIG. 2 and the full line cord gripping position of that figure. These teeth extend parallel to the pivotal axis 16 of parts 17 and 18 and in the locking position are received opposite the gripping face 30 formed in the upper side of member 12.

Figure 6:
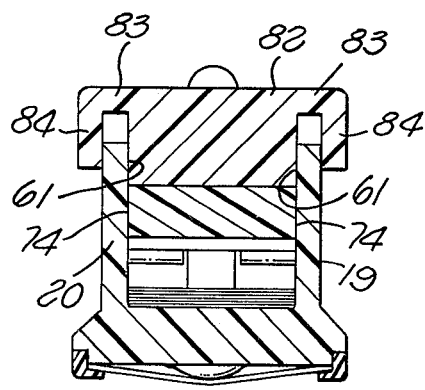

At the left end of portion 59 of member 17, that member has an upwardly projecting wall 82 which may extend directly vertically in the full line position of FIG. 2 and which may have the vertical cross section illustrated in FIG. 6 to define portions 83 extending laterally above the upper edges of side walls 19 and 20 and portions 84 projecting downwardly at the outer sides of those side walls to block unwanted forced spreading of walls 19 and 20 relatively apart to attain the anti-tampering effect disclosed in my copending U.S. application Ser. No. 122,604 filed Feb. 19, 1980 entitled "Cord Locks or the Like Resistant to Tampering". In the upwardly projecting position of member 17 illustrated in broken lines in FIG. 2, the outer downwardly projecting flanges or lugs 84 on member 17 are located entirely above the upper edges of side walls 19 and 20 and do not interfere with spreading movement of those side walls as member 17 is snapped downwardly to its assembled condition between those walls. As member 17 is swung downwardly from its broken line position to its full line position of FIG. 2, lugs 84 move to positions at the outside of the two side walls 19 and 20 to confine those walls against spreading movement. If the walls 19 and 20 are forced apart in the FIG. 2 condition, this action will necessarily result in breakage of projections 84 and indicate to a subsequent user that the device has been violated.

Figure 7:
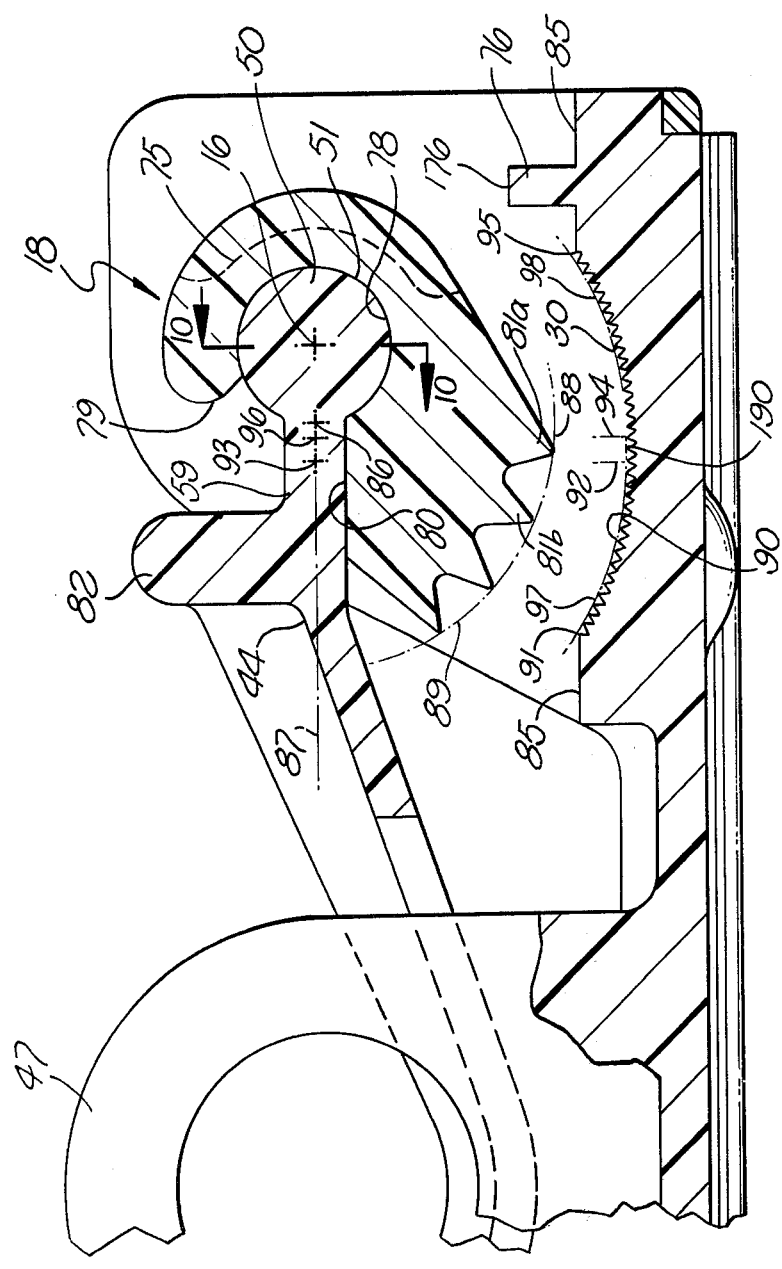
FIG. 7 is an enlarged fragmentary view representing a portion of FIG. 2.

Referring now to FIG. 7, the teeth 81 formed on the underside of locking member 18 and the opposed toothed gripping face 30 of member 12 are preferably of uniform cross section transversely of axis 16 through the entire axial extent between side walls 19 and 20. Further, the vertical cross section of the remainder of the gripping portion 28 of member 12, forwardly and rearwardly of the toothed gripping face 30, is uniform along the entire axial distance between walls 19 and 20 except at the location of the previously discussed cord separating lug 76 on member 12. More particularly, except at the location of that lug, the upper surfaces 85 of portion 28 of member 12 may be horizontal, with the curved gripping face 30 being recessed downwardly beneath the level of those horizontal surfaces 85.

The different teeth 81 of locking member 18 are preferably not centered about the pivotal axis 6 and are not a uniform radial distance from that axis. Instead, these teeth are preferably centered about a second axis 86, which is parallel to but spaced laterally from axis 16 and which in the FIG. 2 full line position of the parts is offset directly leftwardly from axis 16 and in the same horizontal plane 87 as that axis. The peaks 88 of the different teeth 81 thus follow or define the curving pattern 89 represented in FIG. 7 extending about axis 86 and eccentrically with respect to main pivotal axis 16. The circularly leading one of the teeth 81, designated as tooth 81a in FIG. 7, is thus substantially closer to pivotal axis 16 than is the next successive tooth 81b, with the succeeding teeth advancing progressively farther away from axis 16.

The teeth 90 of gripping face 30 of part 12, and the face defined by those teeth, are also arranged in a pattern which is preferably curved essentially arcuately but not centered with respect to pivotal axis 16. These teeth 90 are preferably smaller than teeth 81 of locking member 18, so that the radial dimension of teeth 90 is less than the radial dimension of teeth 81, and the circular spacing between successive teeth 90 is less than the circular spacing between successive teeth 81. Teeth 90 have a radius greater than teeth 81, and are preferably centered about an axis or axes spaced farther from pivotal axis 16 than is the axis 86 of teeth 81. In the preferred arrangement, a first series of the teeth 90, between the locations 91 and 92 of FIG. 7, are centered about an axis 93 which is parallel to and offset leftwardly from pivotal axis 16, while a second series of the teeth 90 between locations 94 and 95 may be centered about a different axis 96 which is slightly closer to axis 16 than is axis 93, but is slightly farther from axis 16 than is axis 86. In the FIG. 2 full line position of the parts, all of these axes 16, 86, 93 and 96 may be parallel to one another and lie in the common horizontal plane 87 of FIG. 7. Between the locations 92 and 94, the teeth 90 may be considered as having no effective curvature about either of the axes 93 and 96, so that in effect a line 190 joining the peaks of teeth 90 between those locations 92 and 94 may extend directly horizontally and parallel to plane 87. The curved pattern defined by the peaks of teeth 90 between the locations 91 and 92 (centered about axis 93) is indicated at 97 in FIG. 7, and the curved pattern defined by the teeth 90 between the locations 94 and 95 and about axis 96 is represented at 98.

In initially placing the assembled device in use, member 17 may be swung upwardly about axis 16 relative to member 12 to the broken line position of FIG. 2, with corresponding swinging movement of the connected element 18 to its broken line position of the figure, enmabling insertion of cords 11 leftwardly through the gap formed vertically between element 18 and the upwardly facing toothed gripping portion 28 of member 12. Grooves 75 in locking member 18 and the intermediate increased diameter portion 77 of that part, coacting with the upwardly projecting lug 76 of member 12, form guideways into which the two cords may be easily inserted for threading between the parts. The cords are advanced leftwardly along the upper surface of member 12 and through the guideways 63 and 64 formed in structure 62 to maintain them in located parallel relation as they project leftwardly beyond the locking device. After the cords have been inserted in this manner, actuating member 17 can be swung downwardly from its broken line position of FIG. 2 to its full line position of that figure, with portion 59 of member 17 engaging edge 80 of member 18 and causing it to swing from its broken line position of FIG. 2 to its full line position of FIGS. 2 and 7 bringing teeth 81 into engagement with the cords and thereby clamping the cords into the recess formed by gripping face 30 and against the curved series of teeth 90 in that recess. Subsequent exertion of rightward longitudinal force on the cords tends to cause counterclockwise pivotal movement of member 18 relative to member 17 and about axis 16, which pivotal movement acts by virtue of the eccentric configuration of both the teeth 81 of member 17 and the teeth 90 of member 12 to move the teeth 81 progressively closer to teeth 90 and thereby grip the cords progressively more tightly. An automatic tightening action is thus attained, effectively and very positively preventing rightward withdrawal of the cords from between the two gripping surfaces. The above discussed specifically defined configuration of those toothed surfaces optimizes the gripping action. During the final portion of the downward swinging movement of the actuating member 17, detenting lug 67 on part 17 is deflected by portion 65 of wall 62 and then returns to a position releasably retaining member 17 in its locking position of FIG. 2. The parts 17 and 12 are retained in their locking condition by insertion of the hasp 48 of padlock 49 through loop 47 at a location above actuating arm 17. The unique recessed and curved configuration of the toothed gripping face 30 of member 12, in conjunction with teeth 81 of element 18, has the effect of maximizing the resistance offered to rightward movement of the cords in the locked condition of the device, and at the same time causing the internal stresses in member 12 to be taken primarily by its lower heavy portion 28 with minimum internal stresses in walls 19 and 20.

While a certain specific embodiment of the present invention has been disclosed as typical, the invention is of course not limited to this particular form, but rather is applicable broadly to all such variations as fall within the scope of the appended claims.

What is claimed is:

1. A device for gripping at least one elongated flexible element and retaining it against longitudinal movement in a predetermined direction, comprising:
    a first member having a gripping surface;
    an actuating member mounted to said first member for relative swinging movement essentially about an axis between a locking position and a released position; and
    a locking member connected to said actuating member for swinging movement therewith between said positions, and having a gripping portion which in said locking position of the actuating member is positioned to clamp said elongated element against said gripping surface of said first member and which in said released position of the actuating member releases said element for longitudinal movement in said direction;
    said locking member being free for limited pivotal movement relative to said actuating member about said axis when the latter is in said locking position;
    said gripping portion of said locking member having a plurality of teeth for contacting and gripping said elongated element which are distributed essentially eccentrically with respect to said axis and adapted to move progressively closer to said gripping surface of said first member to grip said element progressively more tightly as said locking member pivots relative to said actuating member when the latter is in said locking position;

said gripping surface of said first member being shaped to define and form a recess opposite said gripping portion of said locking member into which the locking member presses said elongated flexible element;

said gripping surface having teeth within and defining said recess following essentially a pattern which curves progressively toward said axis as the surface advances about the axis in the direction in which said locking member pivots relative to said actuating member to tighten the grip on said elongated element;

said teeth of said gripping surface of said first member including a first series of said teeth distributed arcuately about a second axis which is essentially parallel to but offset from said first axis, and a second series of said teeth distributed arcuately about a third axis which is essentially parallel to and offset from both of said first and second axes.

2. A device as recited in claim 1, in which said teeth of said locking member are distributed essentially arcuately about a fourth axis essentially parallel to and offset from all of said first, second and third axes.

3. A device as recited in claim 1, in which said teeth of said locking member are distributed essentially arcuately about a fourth axis which is essentially parallel to but offset from all of said first, second and third axes, and is essentially between said first axis and said second and third axes.

4. A device as recited in claim 3, in which said teeth of said gripping portion of said locking member are spaced farther apart than are the teeth of said gripping surface of said first member.

5. A device as recited in claim 4, in which said first member has a projection extending generally toward said locking member near an end of said gripping surface on said first member at a location to be received between and space apart two of said elongated elements clamped against said gripping surface.

6. A device as recited in claim 5, in which said locking member has two recesses formed therein at axially spaced locations and at essentially opposite sides of said projection and defining guide grooves along which two elongated elements are guided to spaced positions between said locking member and said first member.

7. A device as recited in claim 1, including two spaced guideways on said first member for guiding and locating two of said elongated elements in spaced relation at a location offset longitudinally of the elements form said gripping surface of said first member, and detenting means formed on said actuating member and engageable with said first member at a location laterally between said guideways and in a relation releasably retaining said actuating member in said locking position thereof.

8. A device as recited in claim 1, in which said teeth of said gripping surface of said first member include a plurality of said teeth between said first and second series thereof and which are not disposed arcuately about either of said second or third axes but instead are distributed along an essentially straight line extending between said first and second series of teeth.

9. A device for gripping at least one elongated flexible element and retaining it against longitudinal movement in a predetermined direction, comprising:
a first member having a gripping surface;
an actuating member mounted to said first member for relative swinging movement essentially about an axis between a locking position and a released position; and
a locking member connected said actuating member for swinging movement therewith between said positions, and having a gripping portion which in said locking position of the actuating member is positioned to clamp said elongated element against said gripping surface of said first member and which in said released position of the actuating member releases said element for longitudinal movement in said direction;
said locking member being free for limited pivotal movement relative to said actuating member about said axis when the latter is in said locking position;
said gripping portion of said locking member having a plurality of teeth for contacting and gripping said elongated element which are distributed essentially eccentrically with respect to said axis and adapted to move progressively closer to said gripping surface of said first member to grip said element progressively more tightly as said locking member pivots relative to said actuating member when the latter is in said locking position;
said gripping surface of said first member being shaped to define and form a recess opposite said gripping portion of said locking member into which the locking member presses said elongated flexible element;
said gripping surface having teeth within and defining said recess following essentially a pattern which curves progressively toward said axis as the surface advances about the axis in the direction in which said locking member pivots relative to said actuating member to tighten the grip on said elongated element;
said teeth of said locking member being distributed arcuately about a second axis which is essentially parallel to but offset from said first axis, and said teeth of said gripping surface of said first member being distributed arcuately about a third axis which is essentially parallel to said first and second axes and is farther fromsaid first axis than is said second axis.

10. A device for gripping two elongated flexible elements and retaining them against longitudinal movement in a predetermined direction, comprising:
a first member having a gripping surface;
an actuating member mounted to said first member for relative swinging movement essentially about an axis between a locking position and a released position;
a locking member connected to said actuating member for swinging movement therewith between said positions; and having a gripping portion which in said locking position of the actuating member is positioned to clamp at least one of said elongated elements against said gripping surface of said first member and which in said released position of the actuating member releases said element for longitudinal movement in said direction;
said locking member being free for limited pivotal movement relative to said actuating member about said axis when the latter is in said locking position;
said gripping portion of said locking member being constructed to move progressively closer to said gripping surface of said first member and to thereby grip said element progressively more tightly as said locking member pivots relative to said actuating member when the latter is in said locking position;

said first member having a portion which in a predetermined orientation of said device extends generally horizontally beneath said elongated elements at a location offset from said gripping surface; and a structure which is carried by said generally horizontal portion of said first member and which has opposite end portions secured to and projecting upwardly from said first member at opposite sides of said two elongated elements and an upper transverse portion extending laterally between and interconnecting said two end portions, in a relation bridging across the upper sides of said two elongated elements and confining them vertically between said first member and said upper transverse portion of said structure and laterally between said end portions of said structure;

said upper transverse portion of said structure being constructed to form a detent element which is located laterally between said end portions and is connected to said first member only through said end portions of said structure, and is engageable with said actuating member essentially laterally between said two elongated elements in a relation releasably retaining it in said locking position.

11. A device as recited in claim 10, in which said actuating member has a detenting portion which is carried by and swings with said actuating member and projects toward said first member in the direction of relative swinging movement of said actuating member and engages said detent element in locking relation.

* * * * *